US007016317B1

(12) United States Patent
Pathak et al.

(10) Patent No.: US 7,016,317 B1
(45) Date of Patent: Mar. 21, 2006

(54) WIRELESS LOCAL LOOP

(75) Inventors: Yatish Pathak, San Francisco, CA (US); Michael Stumm, Toronto (CA); William M. Snelgrove, Toronto (CA)

(73) Assignee: Soma Networks, Inc., San Francisco, CA (US)

( * ) Notice: Subject to any disclaimer, the term of this patent is extended or adjusted under 35 U.S.C. 154(b) by 772 days.

(21) Appl. No.: 09/717,241

(22) Filed: Nov. 22, 2000

(30) Foreign Application Priority Data

Mar. 27, 2000 (CA) .................................... 2302461

(51) Int. Cl.
*H04Q 7/00* (2006.01)

(52) U.S. Cl. ...................................... 370/329; 370/338

(58) Field of Classification Search ................ 370/328, 370/329, 338, 352, 401; 455/408, 407; 379/112.06, 379/112.07, 112.08, 114.03, 114.21, 114.27
See application file for complete search history.

(56) References Cited

U.S. PATENT DOCUMENTS

| | | | | |
|---|---|---|---|---|
| 5,828,737 | A | * 10/1998 | Sawyer ................... | 379/114.07 |
| 6,075,784 | A | 6/2000 | Frankel et al. .............. | 370/356 |
| 6,081,536 | A | * 6/2000 | Gorsuch et al. ............ | 370/468 |
| 6,097,733 | A | * 8/2000 | Basu et al. .................. | 370/468 |
| 6,154,643 | A | * 11/2000 | Cox ........................... | 455/406 |
| 6,418,132 | B1 | * 7/2002 | Onouchi ..................... | 370/338 |
| 6,526,281 | B1 | * 2/2003 | Gorsuch et al. .......... | 455/452.1 |
| 6,608,838 | B1 | * 8/2003 | Ozluturk ..................... | 370/441 |

FOREIGN PATENT DOCUMENTS

| | | |
|---|---|---|
| GB | 2 332 820 A | 6/1999 |
| WO | WO 98/28927 | 7/1998 |
| WO | WO 98/59523 | 12/1998 |
| WO | WO 01/30003 A1 | 4/2001 |

* cited by examiner

*Primary Examiner*—Chau Nguyen
*Assistant Examiner*—Ian N. Moore
(74) *Attorney, Agent, or Firm*—Katten Muchin Rosenman LLP

(57) ABSTRACT

A wireless local loop system manages radio data transmission capacity and network resources shared by a plurality of subscriber stations by considering the type of connections desired to be created to the subscriber stations and the radio data transmission capacity, and in some cases QoS parameters, and network resources required for those connections. The subscriber stations include data and telephony ports and can include a subscriber utilization client (SUC) to assist in the management process. The SUC in each subscriber station communicates with a network utilization manager (NUM) to request network resources from the base station. The NUM determines the requirements, in data transmission capacity and/or QoS levels, for the desired connection and considers the utilization of the network resources at the base station, or sector of the base station, in determining whether to establish the desired connection. The NUM can consider the required level and a desired level of data transmission capacity and/or QoS levels and allocate resources for the connection according to either level, or therebetween. The SUC and NUM can prioritize the establishment of connections on an appropriate basis, including the type of connection, the parties to the connection, the revenue potential of the connection and the port for the connection at the subscriber station, etc.

89 Claims, 4 Drawing Sheets

WIRELESS LOCAL LOOP

FIELD OF THE INVENTION

The present invention relates to a system, apparatus and method of providing local loop telecommunications services, or the like, through a wireless media. More specifically, the present invention relates to providing such services for both data and voice in a manner which can provide good usage of available shared radio resources, which can include spectrum/bandwidth and transmission power levels and network resources.

BACKGROUND OF THE INVENTION

Much interest has been expressed recently in providing local loop services via mediums other than public switched telephone network (PSTN) copper wire local loops. Local loop services, also referred to as 'last mile' services, are the connection between the subscriber location and a local office or other access point to the PSTN.

One alternative to conventional copper wire local loop infrastructures is wireless local loop (WLL) systems that connect subscribers to the PSTN using radio signals to exchange information, as a substitute for copper wiring, over all or part of the connection between the subscriber and the PSTN. WLL systems have been installed in various locations to date, primarily third world or developing nations where the cost to establish a copper wire infrastructure for local loop services is very high. In more industrialized locations such as North America, including locations were a copper wire infrastructure already exists, great interest in WLL also exists to provide competition in local access services.

Generally, WLL systems developed and/or proposed to date build upon techniques and technologies developed for cellular mobile voice systems, including analog cellular (AMPS) and GSM or CDMA (PCS) cellular systems. Such systems have proven to be very successful to date at providing mobile voice wireless communications and much development has been performed with respect to their technologies.

The present inventors have determined however, that while WLL systems based upon mobile cellular technologies can provide reasonable voice performance, they do not provide a cost effective range of services and/or radio resource efficiencies that will be desired for WLL systems which provide voice and data services.

U.S. Pat. No. 6,075,784 to Frankel et al. teaches a remote data terminal which supports two or more telephone and/or data devices and which connects to a network via a digital subscriber line (DSL) replacement for a conventional local loop. While the remote data terminal taught by Frankel does deal with sharing the DSL line between multiple devices/users at the subscriber end, as the DSL line is not shared with other subscribers/remote terminals, Frankel does not teach the management of data transmission and/or network resources between multiple subscriber units.

It is therefore desired to have a system, apparatus and method to provide local loop services via wireless communications which allows a range of services to be provided in an efficient manner.

SUMMARY OF THE INVENTION

It is an object of the present invention to provide a novel system, apparatus and method of providing local loop services and the like via wireless communication which obviates or mitigates at least some of the above-identified disadvantages of the prior art.

According to a first aspect of the present invention, there is provided a wireless local loop system comprising:
a network utilization manager;
at least one base station including an antenna, a radio, a modem and a communication system; and
a plurality of subscriber stations, each including an antenna, a radio unit and modem to exchange information with said at least one base station, at least two subscriber communications ports and a subscriber utilization client operable with said network utilization manager to assign capacity in said system to at least one of said two subscriber communications ports to create a connection between said base station and said at least one subscriber communication port.

Preferably, the communication system comprises a switch and a router. Also preferably, both a required level of capacity and a desired level of capacity can be considered when establishing a connection, said network utilization manager assigning said desired level of capacity when available and appropriate and said required level of capacity when said required level is available and appropriate and said desired level of capacity is not.

Preferably, said base station includes at least two sectors and the antenna each sector is connected to is a directional antenna. Also preferably, at least one of said communication ports is a telephony port and another of said communication ports is a data port.

Preferably, said network utilization manager is operable to reduce and/or increase assigned capacity to a subscriber station as network conditions change.

According to another aspect of the present invention, there is provided a subscriber station for a wireless local loop, comprising:
a radio operably connected between a modem and an antenna;
a processor operably connected between said modem and at least two communications ports, said processor communicating with a base station via said radio to manage at least the allocation of radio bandwidth for a connection between said base station and at least one of said two communications ports.

Preferably, at least one of the two communication ports is a telephony port and the other of the two communication ports is a data port. Also preferably, the subscriber station includes a wireless media port to communicate with appropriately enabled devices in the vicinity of the subscriber station. Preferably, the subscriber station includes means to determine the purpose for which a connection is desired, said means including means to examine the IP port to which the communication is addressed, the communication port of the subscriber station to which the connection is to be established and/or an explicit indication provided by the process or user desiring the connection.

According to yet another aspect of the present invention, there is provided a method of managing communications between at least one base station and a plurality of subscriber stations in a wireless local loop, said communication being accomplished over a radio bandwidth shared by said base station and each of said subscriber stations, said base station performing the steps of:
(i) receiving a request from a subscriber station to create a desired connection between said base station and said subscriber station, said request indicating the type of said desired connection;

(ii) reviewing each received request and information representing the present allocation of said radio bandwidth to said subscriber stations to determine whether to allocate additional bandwidth to said subscriber station making said request, said review considering the amount of bandwidth and/or network resources required for said indicated type of connection;

(iii) allocating bandwidth and/or network resources and establishing said connection to said subscriber station as determined when it is determined to be appropriate to do so;

(iv) updating said maintained information to reflect the usage of said allocated bandwidth and/or network resources by each said subscriber station and/or to reflect bandwidth which is no longer allocated to a subscriber station after a connection has terminated; and (v) repeating steps (i) through (iv).

The present invention provides a wireless local loop system which manages radio bandwidth shared by a plurality of subscriber stations by considering the type of connections desired to be created with the subscriber stations and the radio bandwidth, and in some cases Quality of Service (QoS) parameters, such as maximum latency, data rates, etc., required for those connections. The subscriber stations include data and telephony ports and can include a subscriber utilization client (SUC) to assist in the management process. The SUC in each subscriber station communicates with a network utilization manager (NUM) to request network resources from the base station. The NUM considers the requirements, in bandwidth and/or QoS levels, for a desired connection and the utilization of the network resources in determining whether to establish the desired connection. The SUC can explicitly inform the NUM of the requirements for a connection, or the NUM can determine the requirements by reference to the type of requested connection, by previously agreed service levels defined for a subscriber station or by any other suitable method. Requirements can include both required and desired bandwidths and/or QoS levels and the NUM can allocate resources for the connection according to either level, or therebetween, as appropriate depending upon network utilization conditions and/or service commitments to subscribers and/or economic considerations, such as prioritizing resource allocation to subscribers who pay a premium for such a level of service. Further, the SUC and NUM can prioritize the establishment of connections on an appropriate basis, including the type of connection, the parties to the connection, the revenue potential of the connection and the port for the connection at the subscriber station.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
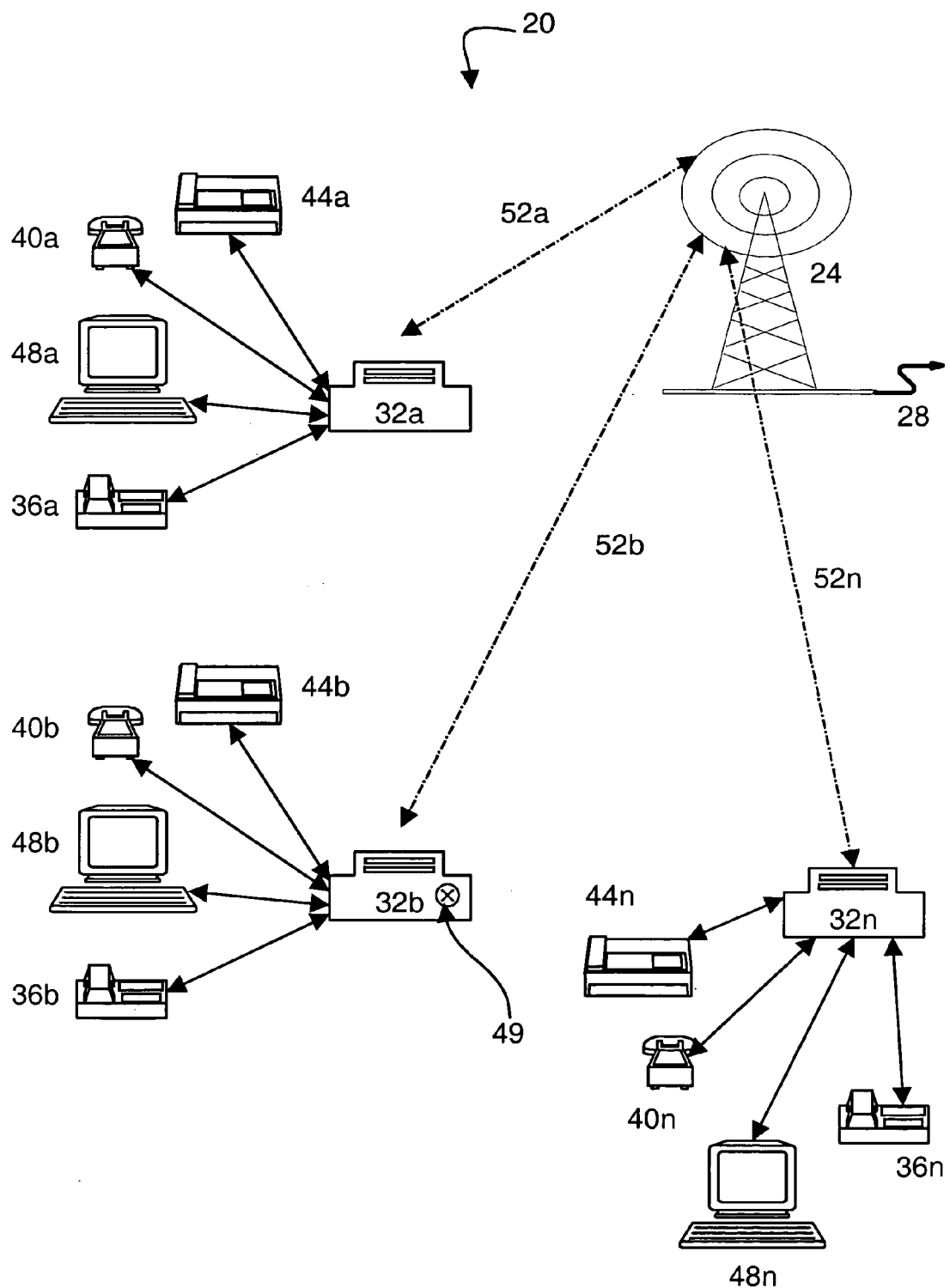
FIG. 1 shows a schematic representation of a WLL system in accordance with the present invention.

A wireless local loop (WLL) system in accordance with an embodiment of the present invention is indicated generally at 20 in FIG. 1. System 20 includes a radio base station 24 which is preferably connected to voice and/or data telecommunications network (not shown), such as a land line-based switched telephone network and/or data network, by one or more backhauls 28. A backhaul 28 can be a T1, T3, E1, E3, OC3 or other suitable land line link, or can be a satellite or other radio or microwave channel link or any other link suitable for operation as a backhaul as will occur to those of skill in the art.

Base station 24 communicates with a plurality of subscriber stations 32 which are installed at subscriber premises. Depending upon the amount of radio resources (spectrum, transmission power, etc.) available, the multiple access technique employed (FDMA, TDMA, CDMA, etc.) and/or the configuration and requirements of the subscriber stations 32, it is contemplated that 'n' subscriber stations, where n is one hundred or more, can be serviced by a base station 24.

In the illustrated embodiment of the present invention, each subscriber station 32 provides telephony ports for two conventional telephones 36,40, a telephony port for a facsimile machine 44 and a data port for a digital networked device, such as a personal computer or information appliance 48. The telephony connection ports, which are described further below, can be standard RJ-11 connectors or any other suitable connector/port as will occur to those of skill in the art. The data port can be an RJ-45 Ethernet port, or any other suitable connector/port for interfacing to digital network-enabled devices as will occur to those of skill in the art. As will be apparent to those of skill in the art, other types and/or combinations of ports can be provided as desired. For example, it is contemplated that in some circumstances a radio, compatible with the emerging 'Bluetooth' or IEEE 802.11 standards will be included in some subscriber stations 32 as a wireless media port 49 (for subscriber station 32b) to allow wireless communications between subscriber stations 32 and appropriately enabled devices in their vicinity. It is also contemplated that wireless media ports 49 providing communication via Infrared or other wireless media to appropriately enabled devices can be provided.

Communications channels 52 are established between base station 24 and each subscriber station 32. Channels 52 allow data (voice data representing digitized voice conversations or "pure" data representing email, html documents, streaming video, etc.) to be transferred between base station 24 and respective subscriber stations 32, preferably in packets, as needed. The implementation/type of packet communication employed is not particularly limited, and can include IP (with TCP or UDP) and/or modifications thereof or any other packet implementation as will occur to those of skill in the art.

The radio resources for channels 52 is shared between base station 24 and all subscriber stations 32 in the reception footprint of that base station 24 or, in the case of a multi-sector base station 24 described below, in the reception footprint of the corresponding sector of a base station 24. Channels 52 can be formed on the shared bandwidth via any suitable multiple access technique, such as CDMA, OFDM, TDMA or FDMA, as will be apparent to those of skill in the art and/or by packetization of the information to be sent between base station 24 and subscriber stations 32. As used herein, the term radio resources comprises all of the factors which limit the sharing of a radio channel by multiple subscriber stations. Radio resources include the amount of spectrum allocated for use by system 20, which can be shared under multiple access techniques as frequency bands, time slots, channels coded with Walsh or Gold codes or the like, and can also include the amount of power used to transmit a radio signal, which is typically limited by the license to the radio spectrum and/or by resulting interference (in CDMA or similar multiple access systems).

As is known, a base station can operate with multiple sectors, defined by directional antennas, each sector comprising a different reception footprint and this allows reuse of available radio spectrum between sectors. By using antennas with 60° broadcast angles, six sectors can be employed at a base station. Similarly, by using antennas with 180° broadcast angles, two sectors can be employed at a base station, or antennas with different broadcast angles can be combined as desired to form sectors of different angles. Base stations 24 with a variety of numbers of sectors, as needed for a distribution and/or number of subscribers, are contemplated herein.

While it is generally assumed that the amount of radio resources within any reception footprint is fixed and yields a given data transmission capacity, the available data transmission capacity can vary between downstream (base station 24 to subscriber station 32) and upstream (subscriber station 32 to base station 24) directions. In CDMA multiple access-based methods, interference between signals from multiple users broadcasting upstream can reduce the aggregate upstream data rates from the higher data rates that can be obtained in the downstream direction, and the reduced power levels employed for users to transmit upstream generally limits the upstream peak data rates in all multiple access methods.

The available data transmission capacity can be allocated as desired, in either direction, to various channels 52. Thus, for example, at one time period system 20 can provide a significant proportion of the total upstream data capacity to channel 52a and almost no upstream data capacity to channels 52b through 52n, to meet a high data transmission requirement of subscriber station 32a, while equally dividing downstream data capacity between all channels 52. At a subsequent time, when the specific need of subscriber station 32a has been addressed, system 20 can allocate upstream and downstream data capacity between channels 52a through 52n on a more equal, or other, basis.

Figure 2:
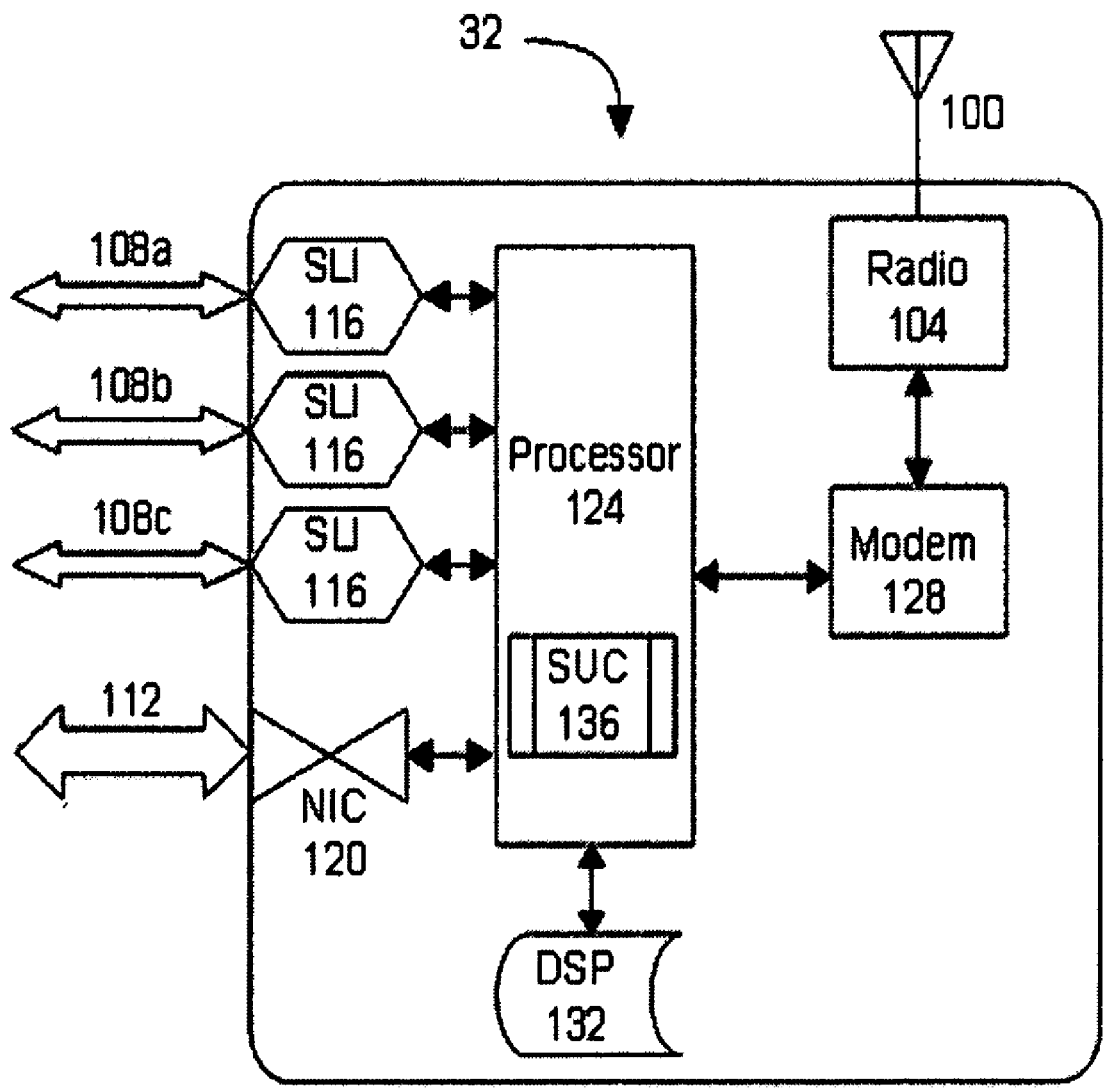
FIG. 2 shows a schematic representation of a subscriber station in the system of FIG. 1.

FIG. 2 shows an embodiment of a subscriber station 32 in more detail. Subscriber station 32 includes at least one antenna 100 and a radio unit 104. As used herein, the term antenna is intended to comprise both single antennas and antenna assemblies, as will be apparent to those of skill in the art.

Subscriber station 32 also includes the above-mentioned telephony connection ports, identified in this Figure as ports 108a, 108b and 108c, for connecting conventional telephones and/or data devices which modulate data in the voice band (such as facsimile machines), respectively, and a data port 112. Each of telephony ports 108 is connected to a subscriber line interface circuit (SLIC) 116, such as an Am79R79 Ringing SLIC manufactured by AMD of One AMD Place, Sunnyvale, Calif., or any other suitable SLIC which provides necessary signaling, voltage levels and other electrical requirements for such telephony connections. Data port 112 is connected to an Ethernet network interface controller (NIC) 120 or other suitable NIC as will occur to those of skill in the art. Each of SLICs 116 and NIC 120 are connected to a processor 124, such as the StrongARM microprocessor manufactured by Intel.

Processor 124 is also connected to a modulator/demodulator (modem) unit 128 which is constructed for use in radio systems, and modem 128 serves as an interface to radio unit 104. Modem 128 operates to: synchronize with transmitted signals; model radio propagation; select channels; and implement error-correcting codes and automatic repeat request and to generally implement suitable multiple access techniques (TDMA, FDMA, CDMA, OFDM, etc.) to establish communications channels 52 with one or more base stations 24.

In a present embodiment, radio unit 104 and modem 128 employ a wideband code-division multiple access technology, similar to that specified by the Third Generation Partnership Project (3GPP). Wideband CDMA is presently preferred as the inventors believe it can increase the aggregate capacity of available bandwidth by exploiting the relatively stable fixed-access situation of a WLL. However, while CDMA technologies are presently preferred, it is also contemplated that technologies employing FDMA, TDMA, OFDM or other multiple access techniques, or combinations thereof, can also be employed if desired.

Processor 124 can also be connected to one or more digital signal processors (DSP) 132, such as a DSP from the AD 2100 family, manufactured by Analog Devices, Inc. of One Technology Way, Norwood Mass., USA. DSPs 132 assist in performing signal processing tasks, such as encryption, channel decoding, filtering, etc. While it is presently preferred that at least one DSP 132 be provided in subscriber stations 32, it is contemplated that this is not essential and that, especially as microprocessors available for use as processor 124 continue to advance in their capabilities and/or decrease in cost, processor 124 can perform all needed functions in some circumstances.

Processor 124 performs a variety of functions, in conjunction with DSP 132 (if present), including implementing suitable voice coders, filters, encoders, data compressors and/or decompressors, packet assembly/disassembly, etc. for each port 108 and port 112. Presently, one or more codecs (not shown), such as the AD73322 codec manufactured by Analog Devices, Inc. are employed with processor 124 for A/D and D/A conversion, performing band limiting and A-law dynamic range compression on voice connections. It is contemplated however, that these codecs can be eliminated, depending upon whether DSP 132 is present and/or the capabilities of DSP 132 and/or processor 124, although suitable D/A and A/D conversion and other related functions will still have to be provided either separately or as an onboard function of processor 124 or DSP 132 (if present).

Processing functions are applied to the ports as appropriate. For example, if port 108c is identified to users as a facsimile-only connection, no voice compression coding will be performed on data received from that port. Similarly, no voice coding will be performed on data port 112, but data compression or other compression techniques can be performed on data received at this port and/or from a dedicated facsimile port such as 108c.

Alternatively, each of telephony ports 108 can employ suitable techniques for determining the type of equipment connected to them. For example, ports 108 can employ the known technique of monitoring a connection for the 2100 Hz tone which is transmitted by modems (such as those used in facsimile machines) when a connection is established. Upon detection of this tone, voice compression coding can be discontinued for the port and/or the connection characteristics altered accordingly, as described below.

If a wireless media port 49 is provided, data received at or transmitted from such a port is also processed accordingly.

In this manner, voice information to and from telephony ports 108 is converted to and from digital form and data from data port 112 and ports 108 is processed and packets assembled for transmission by subscriber station 32, as required. Similarly, processor 124 will operate on packets received at subscriber station 32 from a base station 24 and will disassemble the received packets, process them as appropriate and supply them to the appropriate port or ports 108, 112 or 49.

Processor 124, modem 128 and radio 104 handle all connections between subscriber station 32 and base station 24. Thus, if sufficient radio resources are available (as discussed below) each port 108 and port 112 can have a simultaneous connection to base station 24 and each of these connections can have different characteristics such as QoS levels and/or data rates.

Figure 3:
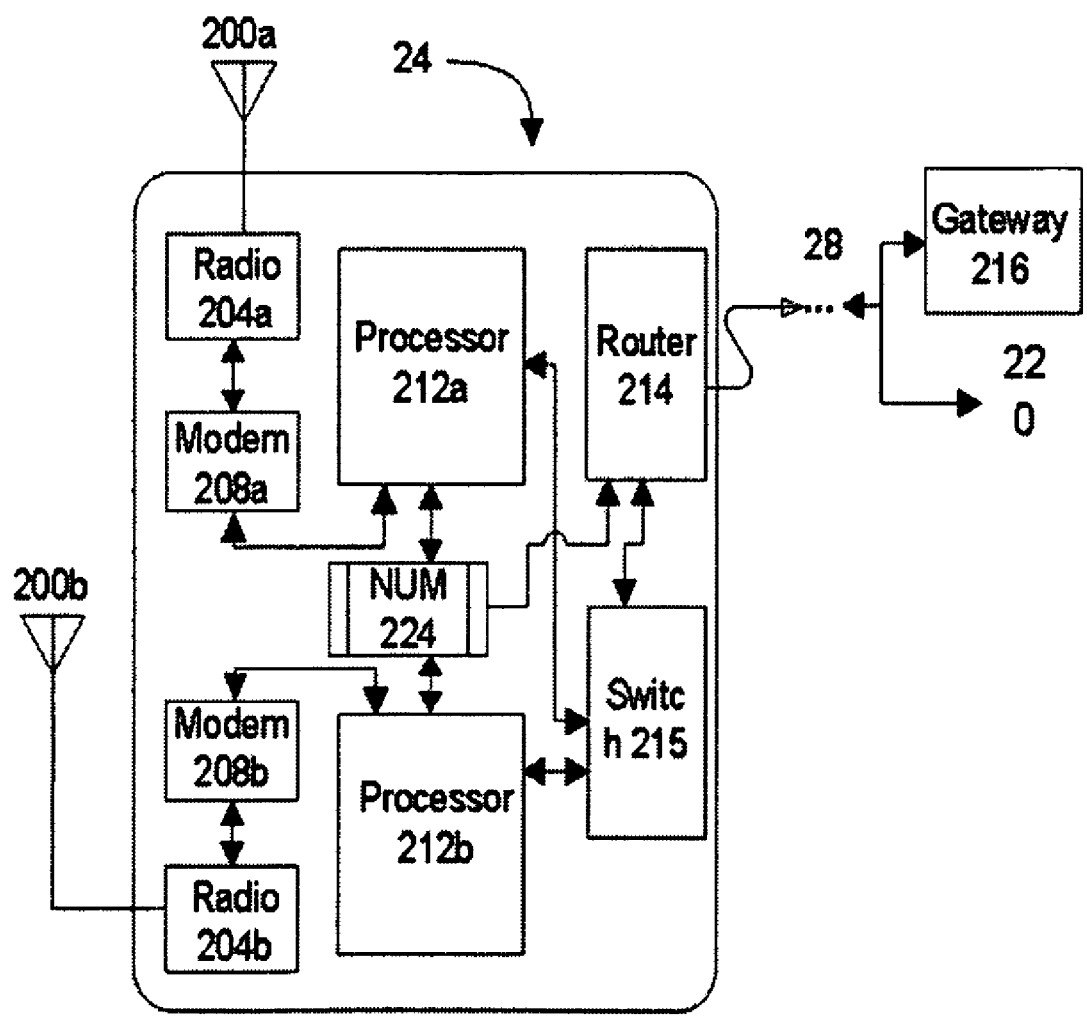
FIG. 3 shows a schematic representation of a multi-sector base station in the system of FIG. 1.

FIG. 3 shows a base station 24 in more detail. As illustrated, base station 24 includes two sectors and has a first antenna 200a for the first sector and a second antenna 200b for the second sector. Again, as used herein the term antenna is intended to comprise an antenna or antenna assembly. When a base station 24 includes multiple sectors, antennas 200 are directional antennas. When a base station 24 includes only a single sector, as described below with reference to FIG. 4, antenna 200 can be a directional or an omni-directional antenna as desired. It is also contemplated that an omni-directional antenna can be provided in addition to one or more directional antennas, with base station 24 multicasting (i.e.—broadcasting the same signal to all subscriber stations) through the omni-directional antenna and non-multicast signals being provided to individual subscriber stations through the direction antennas.

Each antenna 200a, 200b is connected to a respective radio unit 204a, 204b which is connected in turn to a respective modem 208a, 208b. Modems 208a, 208b are connected to a processor 212, such as a SPARC microprocessor system manufactured by SUN Microsystems. In a present embodiment of the invention, processor 212 is a single processor system for single sector base stations, but it is contemplated that systems with processors 212 comprising multiple microprocessors, such as a system including two SPARC microprocessors, can be employed if required in single sector base stations and that multi-sector base stations will likely include at least a single microprocessor processor 212 for each sector.

In the embodiment illustrated in FIG. 3, base station 24 is shown, for clarity, with only two sectors but it is contemplated that in many circumstances base station 24 will include as many as six or more sectors to increase the number of subscribers which can be serviced from a single geographic location of a base station 24. If base station 24 has more than a single sector, an antenna 200 will be provided for each sector, as will a radio unit 204 and a modem 208. In the illustrated embodiment, each sector is provided with a processor 212a, 212b. Employing multi-sector base stations is well known in the prior art and will not be discussed further herein.

In the illustrated embodiment, processors 212a and 212b are connected to a communication system including router 214 and switch 215. Switch 215 can switch packets between subscriber stations 32 served by base station 24. Router 214 routes data packets, irrespective of whether they represent voice or data information, onto backhaul 28 which connects base station 24 to a PSTN gateway 216, to connect to a telecommunications network such as a public switched telephone network (not shown), and/or to a packet switched data network 220, such as the Internet. Depending upon the amount of data traffic to be transferred between base station 24 and gateway 216 and/or network 220, backhaul 28 can comprise one or more T1, T3, E1, E3, OC3, microwave, satellite or other suitable telecommunication links as will occur to those of skill in the art.

Having switch 215 and router 214 located within base stations 24 can provide a number of advantages, including aggregation of packets for transmission through backhaul 28 and a convenient interface to backhauls 28 implemented in different standards. Switch 215 allows switching of calls between sectors of a multi-sector base station 24, or within a single sector, without requiring transmission of data for such connections over backhaul 28. It is however contemplated that switching of such intra-sector or intra-base station calls can be performed after consultation with a network utilization manager, discussed below, located outside of base station 24 and which is communicated with via backhaul 28. In addition, switch 215 and router 214 will permit base station 24 to perform some traffic management.

Figure 4:
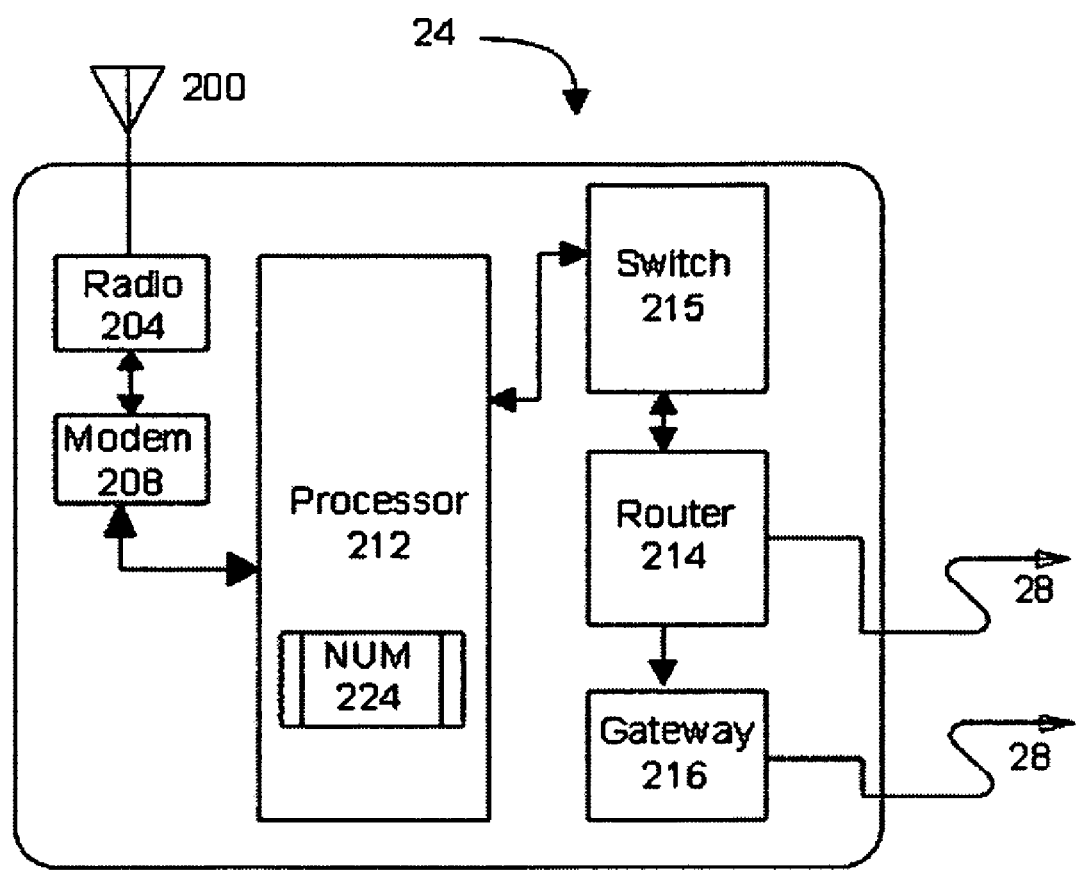
FIG. 4 shows a schematic representation of a single sector base station in the system of FIG. 1.

FIG. 4 shows another embodiment of a base station 24 which includes a single sector, and thus a single radio 204 and modem 208. In this embodiment, base station 24 is intended to serve a reduced number of users, such as when deployed to fill in "shadowed" areas in system 20 wherein users cannot reliably communicate with another, larger, base station 24 due to local conditions (intervening buildings, geography, etc.) or to serve as a base station 24 for a specific group of users who are logically and/or closely located geographically, such as for a group of business or residential users inside a single building. In the embodiment of FIG. 4, gateway 216 is implemented within base station 24 and each of router 214 and gateway 216 can be connected to a suitable backhaul or backhauls 28. In the embodiment of FIG. 4, switch 215 performs intra-sector switching of packets.

It is contemplated that in some uses, the communication system of a base station 24 can include only a switch 215 or only a router 214. For example, while the embodiments of FIGS. 3 and 4 both show backhauls to connect to other networks, such as PSTN or packet networks, it is contemplated that in some circumstances such backhauls 28 will not be required. In such cases, for example, base station 24 can act solely as a standalone network, allowing only communications between the subscriber stations 32 which it services and is such cases only switch 215 need be provided. In another example, in FIG. 3 it may be decided to omit switch 215 as sufficient capacity exists on back haul 28 to permit switching to be done at the same location as gateway 216 and improved network monitoring can be achieved.

In known wireless local loop systems, and cellular radio systems, data transmission capacity and resource management is accomplished by performing call admission control. Essentially, at the time a request is received to establish a connection, either from a subscriber or to a subscriber, a determination is made at the base station as to whether sufficient bandwidth is available for the connection with the subscriber port. If the base station determines that sufficient bandwidth is available, the connection is established. If the base station determines that sufficient bandwidth is not available, the connection is refused and the party trying to establish the connection is sent a 'busy' signal which indicates that they should retry their connection at a later time.

These prior art determinations of available bandwidth are made with a generic connection model that assumes that all connections have the same priority and require voice quality connections. For example, a voice connection or a facsimile connection are arbitrarily deemed to have the same priority and to require the same amount of bandwidth with the same Quality of Service (QoS) requirements for low jitter, latency, etc. that are appropriate for standard voice telephony connections. More recently, wireless systems have included means to provide data connections, although these too are deemed to have a single priority and/or bandwidth and QoS requirements.

Thus, in the prior art, radio bandwidth and resource management is performed only by call admission control and this control is performed at a very coarse level which does not necessarily provide for effective bandwidth and resource usage. For example, one or more connections can be established which have a low priority but which block a subsequent high priority call (for example a call to emergency services at 911). Also, one or more connections to a user can require less bandwidth than has been assigned to them, and subsequent connections to the same or other users can be refused as the required bandwidth has already been allocated, even though the bandwidth is not in use.

So that confidence can be obtained that subscribers are sufficiently served, networks employing such call admission management schemes are typically significantly over-provisioned to ensure sufficient service will be available. Over-provisioning ratios such as three to one for voice networks, for example, can greatly add to the cost of deploying and running such networks.

The terms radio resources and network resources are used somewhat interchangeably herein with respect to system 20. As will be apparent to those of skill in the art, network resources can comprise processing capacity (coding, decoding, encrypting, decrypting, routing, switching, etc.) and other necessary functions, in addition to radio resources. While radio resources may be available for a connection, it will be apparent to those of skill in the art that other limitations, such as the examples of network resources given above, can limit the ability of system 20 to meet agreed data rates and/or QoS levels.

In contrast, in system 20 radio resources and/or network resources are actively managed to achieve fine granularity in usage. Also, as described below, in the present invention this management can be performed both when establishing a connection and also after a connection is established. With the present invention, radio resource management does not employ a generic connection model and instead considers the specific data transmission capacity and/or QoS requirements for a desired new connection and the existing connections in determining whether the new connection can be made. With this management scheme differentiated levels and/or types of service can be offered and a finer level of granularity in radio resource and network resource use can be achieved, providing for more efficient usage of the system resources and capabilities while providing high levels of customer (subscriber) service.

Specifically, processor 124 in each subscriber station 32 implements a subscriber utilization client (SUC) 136 which communicates with a network utilization manager (NUM) 224 at base station 24. In the simplest case, SUC 136 can merely operate to request NUM 224 to establish a connection. For example, SUC 136 will inform NUM 224 that a voice connection is desired and NUM 224 will determine an appropriate set of parameters required for the connection to the subscriber station and determine whether to allocate network and radio resources to establish the connection. In other cases SUC 136 can inform NUM 224 of required parameters for a connection and/or negotiate with NUM 224 to establish the connection. These cases are described below, along with the operation of NUM 224.

While described hereinafter for clarity as being located at base station 24, NUM 224 can be implemented in a variety of manners and it is presently preferred that at least some of the functionality of NUM 224 be implemented in a distributed manner throughout system 20. System 20 can also include one or more network utilization management centers (not shown) which provide additional computing power and centralized control for NUM 224. However, no matter where or how NUM 224 is implemented, each base station will have access to a NUM 224, which is either running locally at the base station 24, or via an appropriate interface or proxy when all or part of NUM 224 is implemented elsewhere, to access the management functions described below.

SUC 136 and NUM 224 communicate and consider a variety of factors in making data transmission capacity availability and allocation decisions. The SUC 136 in each subscriber station 32 communicates with a NUM 224 which considers the needs and defined or desired service level for the subscriber station 32. NUM 224 maintains statistics reflecting the current usage of radio and network resources of the subscriber stations 32 in a sector, along with service levels agreed with those subscriber stations 32.

When a connection is to be made between base station 24 and subscriber station 32, NUM 224 determines if sufficient radio and/or network resources can be assigned in the appropriate sector and establishes the connection if the resources are available. NUM 224 updates its current usage statistics accordingly, in view of the actual resources utilized by the connection.

When NUM 224 wishes to establish a connection to a subscriber station 32, it determines the necessary resource requirements for the connection. When subscriber station 32 wishes to initiate a connection, it contacts base station 24 to forward a request to NUM 224. In either case, NUM 224 is informed of or determines the type of connection desired and NUM 224 considers the actual resources the proposed connection requires or desires.

For example, a connection for a conventional telephone (voice) call made via a packet-based network must meet certain data rates, QoS criteria, etc., including having available the computational resources to implement a G.728 voice coder/decoder at each end of the connection, having a data transmission rate of at least 16 kilobits per second and having an overall latency of no more than 60 milliseconds. The operator of system 20 can specify that the connection cannot be made at levels below these levels. However, as is known, a voice conversation can tolerate an occasional dropped packet.

Other types of connections, such as a data connection, can be established with data rates and/or QoS levels that would be insufficient for a voice call. For example, a data connection may be virtually immune to latency (able to handle several hundreds of milliseconds or more) and require a moderate data rate, yet be sufficiently bursty that higher data rates can be required on an intermittent basis, and the dropping of packets can be unacceptable.

The communication from SUC 136 to NUM 224 can merely identify the type of desired connection (e.g.—voice, web browser, etc.), and NUM 224 can determine specific parameters for that type of connection from a lookup table, or other suitable mechanism, or SUC 136 can include specific requirements, such as data transmission capacity and QoS levels specified by a user, the system operator, or other specification means.

The method for determining the requirements for a particular connection are not particularly limited and any suitable manner, as would now be apparent to those of skill in the art, can be employed. In one embodiment of the present invention, requirements for voice telephony calls are input into subscriber station 32 by the operator of system 20 when the subscriber station 32 is set up to operate with network 20 and/or at any subsequent time as determined by the operator. In another embodiment, these requirements are maintained in NUM 224 by the operator. It is also contemplated that these requirements can be changed, depending upon options selected and paid for by a subscriber, allowing voice calls of different qualities to be selected by a user on a general, or call by call basis. For example a G.729A voice coder can be specified which only requires a data rate of 8 kbps but provides a lower quality voice signal than a G.728 voice coder which requires a data rate of 16 kbps but which provides a somewhat better voice quality.

Requirements for connections through data port 112 can also be defined in a number of manners, as desired. For example, data port 112 can be configured to provide a selected maximum data rate with fixed QoS parameters. In a present embodiment of the invention, connection requirements are determined in a variety of manners, to allow for better granularity in data transmission capacity and resources usage. For example, for Internet Protocol (IP) communications, SUC 136 will consider, or will inform NUM 224, the IP port which is being addressed in a connection to assign requirements for the connection. For example, IP packets addressed to port 80 can be assumed to be packets for an http session and the connection requirements can be set to those appropriate for a web browser session (better downstream data transmission capacity than upstream, accept reasonably high latencies, etc.). Similarly, packets addressed to port 25 can be assumed to be packets for an email session and the connection requirements can be set to those appropriate for an email (low data rate required, high latencies tolerated, etc.). It is also contemplated that other mechanisms, such as the class and priority bits in IPv6 or explicit information from an application communicating with data port 112 can be used to defined appropriate requirements for the connection.

It is also contemplated that traffic shaping can be applied to one or more ports 108 or 112. For example, a voice connection on a telephony port 108 which exceeds an agreed data rate requirement can be downgraded to comply with that requirement by employing a "leaky bucket" packet filter. This could occur, for example, where a user starts including background music in their voice connections, thus exceeding the approximate 50% duty cycle assumed for voice-only connections. If the user has only contracted for a normal voice grade set of connection requirements, the leaky bucket can mark packets which exceed the agreed requirements as being eligible for deletion and, if radio and/or network resources are not available, or if another reason exists to not increase the allocation of resources to increase the connection, these packets will not be transmitted over the connection.

It is also contemplated that a "token bucket" packet filter could be employed for traffic shaping in a similar manner. Token buckets operate to provide a fixed maximum number of packets in a fixed time period and allocate tokens to packets to be transmitted within that time. Packets which do not have a token assigned, are marked as being eligible for deletion.

For connections initiated at a subscriber station 32, SUC 136 communicates the type and/or requirements of a desired connection to NUM 224 which can then determine if resources can be allocated to make the desired connection. If SUC 136 is informed by NUM 224 that desired resources are available, the connection is established and NUM 224 updates its utilization statistics.

The requirements associated with a connection type can be changed, if appropriate, at NUM 224 to deal with changing services, network conditions, customer expectations, etc. For example, the operator of system 20 can reduce the resource requirements for voice calls on a holiday, by specifying a lower quality/lower rate voice coder, to accommodate an anticipated increase in the expected number of voice calls carried by system 20 during the holiday. After the holiday, the previous resource requirements which are appropriate to normal system conditions can be re-established.

A channel 52 of at least some minimal data rate is preferably maintained between a subscriber station 32 and base station 24 at all times that the subscriber station 32 is operational. This allows SUC 136 and NUM 224 to communicate to set up a connection and allows for various network and subscriber management functions to be implemented. Thus, in establishing a connection, an existing channel 52 is allocated sufficient additional data transmission capacity and/or other resources for the connection. Once communication through the connection is complete, the connection is closed and the data transmission capacity and/or other resource allocation to channel 52 is reduced accordingly and can be re-used elsewhere in a sector. If a connection is already established via channel 52 and an additional connection is agreed between SUC 136 and NUM 224, sufficient additional data transmission capacity and/or resources are allocated to channel 52. Again, when either connection is completed, the data transmission capacity and/or resources allocated to channel 52 are reduced by an appropriate corresponding amount.

Similarly, QoS characteristics can be allocated to a channel 52 or taken into consideration when allocating data transmission capacity and/or resources to a channel 52. For example, packets sent via a channel 52 can be given a priority over other packets received at or sent from base station 24 to ensure that latency or other QoS criteria are met. Also, higher levels of forward error correcting (FEC) codes can be employed by subscriber station 32 and base station 24, and the necessary higher data rates allocated, to ensure a desired maximum frame error rate is not exceeded.

In circumstances wherein a level of data transmission capacity or QoS for a connection is merely desired and is unavailable, the connection can be created in a degraded state. In such a case, for example if data transmission capacity or other QoS criteria (such as latency or frame error rates) cannot be met for a desired connection, NUM 224 will establish a degraded connection if permitted by the service level agreed with subscriber station 32. If the degraded connection is permitted, the connection will be established by allocating the data transmission capacity and/or QoS parameters to channel 52 to effect the degraded connection. If additional data transmission capacity or network resources subsequently become available, the connection can be upgraded by NUM 224 allocating additional data transmission capacity or network resources. For example, a facsimile transmission normally has a baud rate of 9600 but can be degraded to a lower baud rate, such as 4800, where the lower baud rate has been selected to fit within the available data transmission capacity.

When NUM 224 receives a request from a third party to establish a connection with a subscriber station 32 and the available resources are not available, but a degraded connection could be established, NUM 224 can suggest a degraded connection to the third party if the third party supports consideration of such an option.

The establishment and/or operation of connections can also be prioritized at subscriber station 32, base station 24 or in general throughout system 20 as desired. In one embodiment SUC 136 includes a prioritization table, or other suitable mechanism as will occur to those of skill in the art, to define connection priorities. For example, a small home office using a facsimile machine and two voice telephone lines connected to a subscriber station 32 can be configured such that if a voice and a facsimile connection are desired at the same time and sufficient network resources exist for only one connection, priority to establish a connection is given to the voice connection. Thus, depending upon the amount of management performed at SUC 136 versus NUM 224, a request from SUC 136 for a connection can include augmented information indicating the type of connection required, i.e.—a "gold" level voice connection rather than a "bronze" level voice connection which NUM 224 can associate with data transmission capacity, computational resources (voice coders, etc.) and/or QoS criteria, or can include specific requested data rates and/or QoS criteria.

Such prioritization schemes can generally be as complex as desired. For example, in the previous example of a small home office, if a voice call is already established and it is desired to add both a second voice and a facsimile connection and if sufficient data rate and/or resources are not available to establish both, then SUC 136 and NUM 224 can be configured to prioritize either requested connection, as desired. Of course, such prioritization schemes can also be defined based upon particular connection parameters, such as the identity of the called party or the calling party, etc. For example, calls to emergency services, such as 911, can be given the highest connection establishment priority throughout system 20.

The prioritization for establishing connections can be defined by a subscriber and/or by the operator of system 20, although it is presently contemplated that the latter will be more prevalent. In fact, it is contemplated that such prioritization schemes can be changed by the operator of system 20 as desired, by transferring new prioritization schemes to subscriber stations 32 via channels 52 and/or by reconfiguring NUM 224. In this manner, prioritization schemes can be changed to adapt to network usage conditions, different billing parameters, etc. Further, such prioritization schemes can be implemented by the operator of system 20 as between subscribers and/or connections. For example, a particular subscriber station 32 can have been assigned a higher priority in NUM 224 than another subscriber station 32 in a sector, on in system 20, and will be given preferential access to resources. Also, as mentioned above, the present invention also permits differentiated levels of services and connections. For example, standard telephone connections in a cellular telephone system are typically processed by voice codecs to require a data rate of about 8 kilobits per second (kbps). While this provides reasonable quality for many purposes, better quality voice connections can be provided by system 20. For example, levels of connections providing a quality equivalent to CD Audio quality and/or stereophonic voice connections (i.e.—the "gold" connection referred to above) can be offered. Similarly, different levels (256 kilobits per second, 1 megabit per second, etc.) of data rate connections can be offered at network port 112.

Further, such 'levels' need not be defined in terms of data rate, but can be defined by QoS criteria or combinations of data rate and QoS criteria. For example, a data connection for browsing on the world wide web could be defined as guaranteeing an effective rate of ½ megabits per second, but also being able to tolerate a total latency of up to three hundred milliseconds while a videophone connection could be defined as guaranteeing a rate of ½ megabits per second but being able to tolerate a maximum total latency of no more than twenty milliseconds. In each circumstance, SUC 136 advises the type of connection required to NUM 224 which considers the required data rate and QoS criteria to then appropriately determine if the connection can be established.

As mentioned above, services and connections can also be defined with desired levels of connection and minimum levels of connection and wherein these levels are allowed to change even after a connection is established. For example, the above-mentioned connection for browsing on the world wide web can be defined as desiring ½ megabits per second and latency not in excess of three hundred milliseconds, but having a minimum requirement of /1;4 megabits per second and maximum latency of up to one second. If, when the request to establish the connection is first made, NUM 224 determines that sufficient data transmission capacity is available to meet the desired connection levels, then the connection is established for those criteria. If the subscriber station 32 subsequently requires additional data transmission capacity for another service, or if NUM 224 requires network resources for another connection, system 20 can degrade the web browser connection as required, down to the minimum rate and/or maximum latency criteria defined for that connection, to free up data transmission capacity and resources to meet the requirements for the new connection. Conversely, if the connection was established with less than the desired maximum criteria due to a limitation of resources when the connection was first established and additional resources subsequently become available, the connection can be upgraded to the desired maximum data transmission capacity level, or an intermediate level, if appropriate. Of course, system 20 can relate different costs to such different levels of services, as desired and this is another factor which can be used by SUC 136 and NUM 224 to prioritize connections (i.e.—to improve or maximize revenues).

This also allows an operator to offer additional capacity in a time-limited manner, when appropriate. Specifically, if the operator has data transmission capacity which is not being used at a particular time, an offer can be made to a subscriber station 32 to employ that data transmission capacity for an existing connection, if desired. For example, a connection for web browsing can have a pop up window overlaid on it by subscriber station 32 offering the user a button which can be selected with the GUI to get an additional amount of data transmission capacity, for a fixed period of time for a fixed cost, e.g.—"Press Below to Double Your Data Transmission Rate for the Next 30 Seconds for 5 Cents" which can be used to download a file, etc. In other cases other consideration can be employed. For example, an offer to double the data transmission capacity for an agreed period of time can require the user to agree to the downloading of an advertisement to the user, before the additional data transmission capacity is made available.

In another example, a connection can be established for an http (web browsing) session, determined by port 80 being addressed, with an agreed set of connection parameters that are appropriate for such a connection. However, when the user of that http session wishes to download a file via ftp (again as determined by the port addressed) SUC 136 and NUM 224 can increase the data transmission capacity and/or network resources allocated to the connection to a level appropriate to an htpp session and an ftp session. Once the ftp download is complete, SUC 136 and NUM 224 deallocate the resources and/or data transmission capacity from the connection to return the total allocated to that agreed for the http session.

Further, as the amount of available data transmission capacity to and from base station 24 is not necessarily symmetric (as discussed above, generally more data transmission capacity exists downstream than upstream), NUM 224 can consider separately the upstream and downstream data transmission requirements of a connection when deciding to allow the connection. For example, if a facsimile is being transmitted to a subscriber station 32, relatively large amounts of data must be transmitted downstream to subscriber station 24 while only relatively small amounts of data (consisting essentially of acknowledgements) must be sent upstream from the subscriber station 32 to the base station 24. Accordingly, NUM 224 can accept a connection to receive a facsimile at a subscriber station 32 requiring a given amount of available data transmission capacity and yet refuse to establish a connection to transmit a facsimile from a subscriber station 32 to a base station 24 requiring the same given amount of data transmission capacity as the available amount of data transmission capacity and/or resources in each direction will often differ.

The above-described embodiments of the invention are intended to be examples of the present invention and alterations and modifications may be effected thereto, by those of skill in the art, without departing from the scope of the invention which is defined solely by the claims appended hereto.

We claim:

1. A wireless local loop system comprising:
   a network utilization manager;
   at least one base station including an antenna, a radio, a modem, and a communication system;
   a plurality of subscriber stations, each including an antenna, a radio unit, and modem to exchange information with said at least one base station, at least two subscriber communications ports and a subscriber utilization client operable with said network utilization manager to assign capacity in said wireless local loop system to at least one of said two subscriber communications ports to create a desired connection between said base station and said at least one subscriber communication port; and
   a prioritization table for at least one of said plurality of subscriber stations, and at least one of said subscriber utilization client in said subscriber station and said network utilization manager employing said prioritization table when assigning capacity to said at least one subscriber communications port in said at least one subscriber station, and
   wherein information in said prioritization table is downloaded to said subscriber station from said base station.

2. The wireless local loop system as claimed in claim 1 wherein each said subscriber station requests said network utilization manager to establish a connection to said at least one subscriber communication port, said network utilization manager determining a required data rate for said connection from said request.

3. The wireless local loop system as claimed in claim 2 wherein said network utilization manager further determines a desired data rate from said request.

4. The wireless local loop system as claimed in claim 3 wherein monetary charges associated with said connection differ according to whether said connection is established at said required data rate or said desired data rate.

5. The wireless local loop system as claimed in claim 1 wherein said network utilization manager further determines at least one QoS level required for said connection.

6. The wireless local loop system as claimed in claim 4 wherein said network utilization manager further determines at least one QoS level desired for said connection from said request.

7. The wireless local loop system as claimed in claim 6 wherein monetary charges associated with said connection differ according to whether said connection is established at said at least one required QoS level or said at least one desired QoS level desired for said connection.

8. The wireless local loop system as claimed in claim 1, wherein said base station is connected to a public switched telephone network via a PSTN gateway.

9. The wireless local loop system as claimed in claim 8 wherein said base station is connected to said PSTN gateway via a backhaul connection.

10. The wireless local loop system as claimed in claim 1 wherein at least one of said at least two subscriber communications ports comprises a data communication port.

11. The wireless local loop system as claimed in claim 10, wherein said data communication port comprises an Ethernet port.

12. The wireless local loop system as claimed in claim 10, wherein said data communication port comprises a radio port for communication with radio-enabled devices adjacent said subscriber station.

13. The wireless local loop system of claim 10 comprising at least two telephony ports in addition to said data communication port.

14. The wireless local loop system of claim 13 wherein one of said at least two telephony ports comprises a telephony data port for data modulated in the voice band.

15. The wireless local loop system as claimed in claim 1 including at least two base stations and wherein said network utilization manager is implemented in a distributed manner on at least two of said at least two base stations.

16. The wireless local loop system as claimed in claim 4 wherein said communication system comprises a router.

17. The wireless local loop system as claimed in claim 16 wherein said base station comprises at least two sectors, each sector including an antenna, a radio, a modem, and wherein said antenna is directional to define a reception footprint for each respective sector substantially different from the reception footprint of each other sector, each sector communicating with said router and wherein said network utilization manager manages and assigns resources on a per sector basis.

18. The wireless local loop system as claimed in claim 16 wherein said communication system further comprises a switch.

19. The wireless local loop system as claimed in claim 18, wherein said switch and router in said base station are connected to a packet network via a backhaul connection.

20. The wireless local loop system as claimed in claim 18 wherein said switch and router are operable to establish connections between subscriber stations serviced by the same base station.

21. The wireless local loop system as claimed in claim 19 and further including at least one network management center connected to said at least one base station via said backhaul, said network utilization manager being implemented in a distributed manner on said network management center and said at least one base station.

22. The wireless local loop system as claimed in claim 1 wherein said network utilization manager further determines at least one QoS level required for said connection.

23. The wireless local loop system as claimed in claim 22 wherein said network utilization manager further determines at least one QoS level desired for said connection from said request.

24. The wireless local loop system as claimed in claim 23, wherein said base station is connected to a public switched telephone network via a PSTN gateway.

25. The wireless local loop system as claimed in claim 24 wherein said base station is connected to said PSTN gateway via a backhaul connection.

26. The wireless local loop system as claimed in claim 23 wherein at least one of said at least two subscriber communications ports comprises a data communication port.

27. The wireless local loop system as claimed in claim 26, wherein said data communication port comprises an Ethernet port.

28. The wireless local loop system as claimed in claim 26, wherein said data communication port comprises a radio port for communication with radio-enabled devices adjacent said subscriber station.

29. The wireless local loop system of claim 26 comprising at least two telephony ports in addition to said data communication port.

30. The wireless local loop system of claim 29 wherein one of said at least two telephony ports comprises a telephony data port for data modulated in the voice band.

31. The wireless local loop as claimed in claim 30 wherein said subscriber station distinguishes between voice communications and facsimile or data communications at said telephony port.

32. The wireless local loop system as claimed in claim 23 including at least two base stations and wherein said network utilization manager is implemented in a distributed manner on at least two of said at least two base stations.

33. The wireless local loop system as claimed in claim 23 wherein said communication system comprises a router.

34. The wireless local loop system as claimed in claim 33 wherein said base station comprises at least two sectors, each sector including an antenna, a radio, a modem, and wherein said antenna is directional to define a reception footprint for each respective sector substantially different from the reception footprint of each other sector, each sector communicating with said router, and wherein said network utilization manager manages and assigns resources on a per sector basis.

35. The wireless local loop system as claimed in claim 33 wherein said communication system further comprises a switch.

36. The wireless local loop system as claimed in claim 35, wherein said switch and router in said base station are connected to a packet network via a backhaul connection.

37. The wireless local loop system as claimed in claim 36 and further including at least one network management center connected to said at least one base station via said backhaul, said network utilization manager being implemented in a distributed manner on said network management center and said at least one base station.

38. The wireless local loop system as claimed in claim 35 wherein said switch and router are operable to establish connections between subscriber stations serviced by the same base station.

39. The wireless local loop system as claimed in claim 23 wherein monetary charges associated with said connection differ according to whether said connection is established at said at least one required QoS level or said at least one desired QoS level desired for said connection.

40. The wireless local loop system as claimed in claim 39 wherein said network utilization manager determines both a required data rate from said request.

41. The wireless local loop system as claimed in claim 40 wherein said network utilization manager also determines a desired data rate from said request.

42. The wireless local loop system as claimed in claim 41 wherein monetary charges associated with said connection differ according to whether said connection is established at said required data rate or said desired data rate.

43. The wireless local loop system as claimed in claim 39 wherein said base station is connected to a public switched telephone network via a PSTN gateway.

44. The wireless local loop system as claimed in claim 43 wherein said base station is connected to said PSTN gateway via a backhaul connection.

45. The wireless local loop system as claimed in claim 39 wherein at least one of said at least two subscriber communications ports comprises a data communication port.

46. The wireless local loop system as claimed in claim 45, wherein said data communication port comprises an Ethernet port.

47. The wireless local loop system as claimed in claim 45, wherein said data communication port comprises a radio port for communication with radio-enabled devices adjacent said subscriber station.

48. The wireless local loop system of claim 45 comprising at least two telephony ports in addition to said communication data port.

49. The wireless local loop system of claim 48 wherein one of said at least two telephony ports comprises a telephony data port for data modulated in the voice band.

50. The wireless local loop system as claimed in claim 49 wherein said subscriber station distinguishes between voice communications and facsimile or data communications modulated in the voice band at said telephony port.

51. The wireless local loop system as claimed in claim 39 including at least two base stations and wherein said network utilization manager is implemented in a distributed manner on at least two of said at least two base stations.

52. The wireless local loop system as claimed in claim 39 wherein said communication system comprises a router.

53. The wireless local loop system as claimed in claim 52 wherein said base station comprises at least two sectors, each sector including an antenna, a radio, a modem, and wherein said antenna is directional to define a reception footprint for each respective sector substantially different from the reception footprint of each other sector, each sector communicating with said router, and wherein said network utilization manager manages and assigns resources on a per sector basis.

54. The wireless local loop system as claimed in claim 52 wherein said communication system further comprises a switch.

55. The wireless local loop system as claimed in claim 54, wherein said switch and router in said base station are connected to a packet network via a backhaul connection.

56. The wireless local loop system as claimed in claim 55 and further including at least one network management center connected to said at least one base station via said backhaul, said network utilization manager being implemented in a distributed manner on said network management center and said at least one base station.

57. The wireless local loop system as claimed in claim 54 wherein said switch and router are operable to establish connections between subscriber stations serviced by the same base station.

58. The wireless local loop system as claimed in claim 1, wherein said base station is connected to a public switched telephone network via a PSTN gateway.

59. The wireless local loop system as claimed in claim 58 wherein said base station is connected to said PSTN gateway via a backhaul connection.

60. The wireless local loop system as claimed in claim 1 wherein at least one of said at least two subscriber communications ports comprises a data communication port.

61. The wireless local loop system as claimed in claim 60, wherein said data communication port comprises an Ethernet port.

62. The wireless local loop system as claimed in claim 60, wherein said data communication port comprises a radio port for communication with radio-enabled devices adjacent said subscriber station.

63. The wireless local loop system of claim 60 comprising at least two telephony ports in addition to said data communication port.

64. The wireless local loop system of claim 63 wherein one of said at least two telephony ports comprises a telephony data port for data modulated in the voice band.

65. The wireless local loop system as claimed in claim 64 wherein said subscriber station distinguishes between voice communications and facsimile or data communications modulated in the voice band at said telephony port.

66. The wireless local loop system as claimed in claim 1 including at least two base stations, and wherein said network utilization manager is implemented in a distributed manner on at least two of said at least two base stations.

67. The wireless local loop system as claimed in claim 1 wherein said communication system comprises a router.

68. The wireless local loop system as claimed in claim 67 wherein said base station comprises at least two sectors, each sector including an antenna, a radio, a modem, and wherein said antenna is directional to define a reception footprint for each respective sector substantially different from the reception footprint of each other sector, each sector communicating with said router, and wherein said network utilization manager manages and assigns resources on a per sector basis.

69. The wireless local loop system as claimed in claim 67 wherein said communication system further comprises a switch.

70. The wireless local loop system as claimed in claim 69, wherein said switch and router in said base station are connected to a packet network via a backhaul connection.

71. The wireless local loop system as claimed in claim 70 and further including at least one network management center connected to said at least one base station via said backhaul, said network utilization manager being implemented in a distributed manner on said network management center and said at least one base station.

72. The wireless local loop system as claimed in claim 69 wherein said switch and router are operable to establish connections between subscriber stations serviced by the same base station.

73. The wireless local loop system as claimed in claim 3, wherein said base station is connected to a public switched telephone network via a PSTN gateway.

74. The wireless local loop system as claimed in claim 73 wherein said base station is connected to said PSTN gateway via a backhaul connection.

75. The wireless local loop system as claimed in claim 3 wherein at least one of said at least two subscriber communications ports comprises a data communication port.

76. The wireless local loop system as claimed in claim 75, wherein said data communication port comprises an Ethernet port.

77. The wireless local loop system as claimed in claim 75, wherein said data communication port comprises a radio port for communication with radio-enabled devices adjacent said subscriber station.

78. The wireless local loop system of claim 75 comprising at least two telephony ports in addition to said data communication port.

79. The wireless local loop system of claim 78 wherein one of said at least two telephony ports comprises a telephony data port for data modulated in the voice band.

80. The wireless local loop system as claimed in claim 79 wherein said subscriber station distinguishes between voice communications and facsimile or data communications modulated in the voice band at said telephony port.

81. The wireless local loop system as claimed in claim 3 including at least two base stations and wherein said network utilization manager is implemented in a distributed manner on at least two of said at least two base stations.

82. The wireless local loop system as claimed in claim 3 wherein said communication system comprises a router.

83. The wireless local loop system as claimed in claim 82 wherein said base station comprises at least two sectors, each sector including an antenna, a radio, a modem, and wherein said antenna is directional to define a reception footprint for each respective sector substantially different from the reception footprint of each other sector, each sector communicating with said router, and wherein said network utilization manager manages and assigns resources on a per sector basis.

84. The wireless local loop system as claimed in claim 82 wherein said communication system further comprises a switch.

85. The wireless local loop system as claimed in claim 84, wherein said switch and router in said base station are connected to a packet network via a backhaul connection.

86. The wireless local loop system as claimed in claim 85 and further including at least one network management center connected to said at least one base station via said backhaul, said network utilization manager being implemented in a distributed manner on said network management center and said at least one base station.

87. The wireless local loop system as claimed in claim 84 wherein said switch and router are operable to establish connections between subscriber stations serviced by the same base station.

88. A wireless local loop system comprising:
a network utilization manager;
at least one base station including an antenna, a radio, a modem, and a communication system including a router and a switch;
a plurality of subscriber stations, each including an antenna, a radio unit, and modem to exchange information with said at least one base station, at least two subscriber communications ports and a subscriber utilization client operable with said network utilization manager to assign capacity in said local loop system to at least one of said two subscriber communications ports to create a desired connection between said base station and said at least one subscriber communication port, wherein said switch and said router are operable to establish connections between subscriber stations serviced by the same base station, wherein each said subscriber station is configured to request said network utilization manager to establish a connection to said at least one subscriber communication port, said network utilization manager determining both a required data rate and a desired data rate for said connection from said request, and wherein monetary charges associated with said connection differ according to whether said connection is established at said required data rate or said desired data rate.

89. A wireless local loop system comprising:

a network utilization manager;

at least one base station including an antenna, a radio, a modem and a communication system including a router and a switch;

a plurality of subscriber stations, each including an antenna, a radio unit, and modem to exchange information with said at least one base station, at least two subscriber communications ports, and a subscriber utilization client operable with said network utilization manager to assign capacity in said local loop system to at least one of said two subscriber communications ports to create a desired connection between said base station and said at least one subscriber communication port, wherein said switch and router are operable to establish connections between subscriber stations serviced by the same base station, wherein each said subscriber station requests said network utilization manager to establish a connection to said at least one subscriber communication port, said network utilization manager determining a required data rate for said connection from said request, and wherein said network utilization manager further determines both at least one QoS level required for said connection and at least one QoS level desired for said connection from said request.

* * * * *